July 22, 1924.  1,502,083
H. ZOELLY
LUBRICATING DEVICE FOR TOOTHED GEARINGS
Filed Oct. 23, 1922
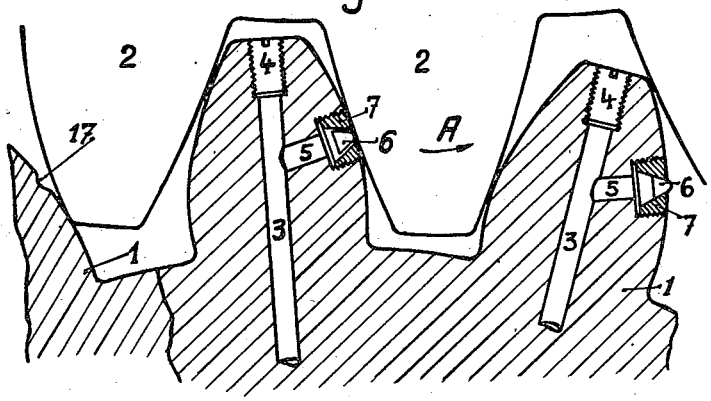
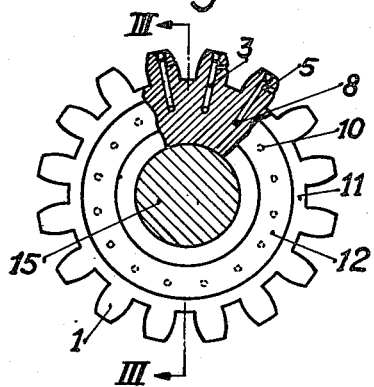
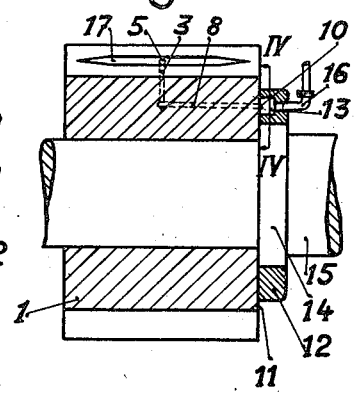
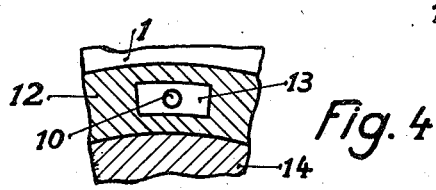
Inventor
Heinrich Zoelly Patented July 22, 1924.

1,502,083

UNITED STATES PATENT OFFICE.

HEINRICH ZOELLY, OF ZURICH, SWITZERLAND.

LUBRICATING DEVICE FOR TOOTHED GEARINGS.

Application filed October 23, 1922. Serial No. 596,445.

*To all whom it may concern:*

Be it known that I, HEINRICH ZOELLY, a citizen of the Republic of Switzerland, residing at 19 Hardturmstrasse, Zurich, Switzerland, have invented certain new and useful Improvements in Lubricating Devices for Toothed Gearings, of which the following is a specification, reference being had therein to the accompanying drawing.

This invention relates to a lubricating device for toothed gearings of which the teeth of at least one gear wheel are each provided with at least one channel for supplying a lubricant under pressure.

The object of the invention is to prevent excessive wear of the working i. e. the driving flanks of the teeth of the slowly running gear wheels of a transmission gearing. The invention bases on the cognition that the wear of the flanks or faces of the teeth is mainly caused by an insufficient lubrication of the cooperating faces of the teeth and that the insufficient lubrication is due to the fact that the driving flanks of the teeth have sufficient time to squeeze the lubricant from between the parts in contact with each other. This drawback is overcome according to the present invention by supplying the lubricant in a positive way to the driving flanks of the teeth and at the moment in which the danger of squeezing out the lubricant reaches its maximum with the known gearings. To this end according to the present invention the channels for supplying the lubricant end in the portion of the driving flanks of the toothed wheel adjacent to the pitch-circle and the supply of the lubricant from those channels is controlled in dependency on a determined relative position of the flanks of the teeth cooperating with each other.

Two constructional examples of the subject matter of the present invention are illustrated on the accompanying drawing in which:

Fig. 1 shows in a side view at two different sections parts of a toothed gearing having a simple ratio, the discharge of the lubricant from the channels in the pinion being controlled by means of conical valves, Fig. 2 shows partly in side view and partly in section the pinion of a gearing in which the channels register once during a complete revolution of the pinion with a device adapted to supply the lubricant, Fig. 3 is a section along line III—III of Fig. 2 and Fig. 4 is a section along line IV—IV of Fig. 3 drawn to an enlarged scale.

Referring to Fig. 1, 1 denotes the pinion and 2 is the large gear wheel driven by the pinion in the direction of the arrow A. Each tooth of the pinion 1 is provided with a radial bore 3. The bores 3 of all the teeth of the pinion are at their inner ends connected to means for supplying the lubricant which means are not illustrated in Fig. 1, the outer ends of the bores being closed fluid-tight by the screw plugs 4. Further in each tooth of the pinion a bore 5 is arranged the axis of which is at an angle to the axis of the bore 3, the two bores 3 and 5 communicating with each other. The discharge of the lubricant from each channel formed by a bore 3 and a bore 5 is controlled by a valve 6 which, in a known manner, projects beyond the face of the tooth in its closed position; the valve 6 coacts with a valve seat 7 which is screwed into the tooth of the pinion. The valves 6 are ordinarily kept in their closed position by the pressure under which the lubricant is supplied. A pressure corresponding to the pressure at pitch-line may be imparted to the lubricant by means not shown in the drawing. The bores 5 and the valves 6 are so arranged that the latter project beyond the flanks of the teeth in the pitch-circle. The discharge openings of the channels 3 and 5 controlled by the valves 6 end approximately in the pitch circle in a groove 17 extending over the greatest part of the driving flank of the pinion tooth, the groove 7 being covered by the cooperating flank of the tooth of the gear wheel 2 when the valve 6 is open.

With the gearing described above the valves 6 are moved inwardly, i. e. in the direction in which they open, when the portions of the flanks in the neighbourhood of the pitch-circles of two cooperating teeth bear against each other, lubricant then flows into the groove 17 and is thereby distributed along nearly the whole width of said portions of the teeth, so that those portions are lubricated in the desired manner.

Obviously the arrangement of the channels 3 and 5 and the arrangement and the design of the valves 6 and of the grooves 17 may be altered in many ways without departing from the present invention. For instance the teeth of the gear wheel 2 may be provided with channels for supplying the lubricant and with valves for controlling the discharge of the lubricant from said channels, said channels and valves being arranged in exactly the same manner as is shown with the gear-wheel 1. Further a plurality of channels of the type of the channels 3 and 5 may be provided in every tooth of the pinion or in every tooth of the wheel 2, which arrangement will be easily understood without being illustrated in a separate figure of the drawing.

With the toothed gearing of which only the pinion is shown in Figs. 2–4 each tooth of the pinion 1 is provided with a bore 8 extending over a portion of the width of a tooth in addition to the bores 3 and 5 (Fig. 3). The bores 8, 3, 5 of each tooth form a channel adapted to supply lubricant to the driving flank of a tooth. The discharge openings of these channels are continuously in open connection with a groove 17 on the driving flank of the tooth and extending over the greatest portion of the width of the tooth of the pinion. The entrance openings 10 of these channels of the pinion are arranged in the lateral plane 11 of the latter. 12 denotes a stationary ring, bearing against the lateral plane 11 and being provided with a chamber 13. When the toothed gearing is assembled the ring 12 rests on the circumference of a collar 14 provided on the shaft 15 carrying the pinion 1. 16 designates a conduit connected to the chamber 13, the conduit 16 together with the ring 12 and the chamber 13 form a device to supply lubricant under pressure to the channels 8, 3, 5.

Each channel 8, 3, 5 registers once with the chamber 13 during one complete revolution of the pinion. As soon as this is the case lubricant is forced through the entrance opening 10 into the respective channel and flows into the groove 17 where it effects a lubrication of the cooperating flanks of the teeth. By means of a suitable angular adjustment of the ring 12 the moment in which a channel 8, 3, 5 registers with the chamber 13 may be made dependent on a determined relative position of the cooperating flanks of the teeth of the gearing.

Also with this constructional example a plurality of channels adapted to supply lubricant to the driving flanks of the teeth may be provided in each tooth of the pinion or of the gear wheel of the gearing instead of only one channel as has been described above.

I claim:

1. Co-acting gear wheels having at least one channel in a tooth of a pair of co-acting teeth, and means controlled by the other tooth to effect the discharge of lubricant from said channel when the teeth co-act.

2. Co-acting gear wheels having at least one lubricating channel in a tooth of a pair of co-acting teeth, a valve controlling said channel and operated by the other gear wheel to release oil at the flank of a tooth when in mesh.

3. Co-acting gear wheels having at least one lubricating channel terminating in the flank of a tooth of one of a pair of meshing teeth, and a valve controlling the discharge of lubricant operated upon contact of the co-acting teeth flanks.

4. A gear wheel comprising at least one lubricating channel in a tooth of one wheel and terminating at its flank, a valve therein controlling the discharge of lubricant, means to supply lubricant under pressure to said channel, said valve arranged for operation by the meshing gear.

5. A gear wheel comprising at least one lubricating channel in each tooth, valves controlling the discharge of lubricant at the flanks of the teeth, and means to supply lubricant under pressure successively to said channels, said valves arranged for operation by the meshing gear wheel.

6. Co-acting gear wheels, comprising at least one lubricating channel in each gear wheel terminating substantially at the pitch line of the teeth and having at least one groove in the tooth flank radiating from the discharge end of said channel, adjustable means to successively supply said channels with lubricant under pressure, and a valve at the discharge end of each channel operated by the teeth of the meshing gear as they move past co-acting position.

7. A gear wheel having channels in its teeth, each channel arranged to discharge at the flank of a tooth and having its entrance opening arranged in the lateral plane of the wheel, an adjustable, stationary member bearing against the lateral plane of the wheel and provided with a lubricant chamber, each channel registering once with said chamber during a complete rotation of a wheel, and means to supply lubricant to said chamber.

8. A gear wheel having channels in its teeth and a groove in one flank of each tooth extending over the greater portion of the width of the flank, each channel having a single outlet terminating substantially at the pitch line of the tooth in said groove, and means to supply lubricant to said channels.

In testimony whereof I affix my signature.

HEINRICH ZOELLY.